United States Patent Office 3,737,470
Patented June 5, 1973

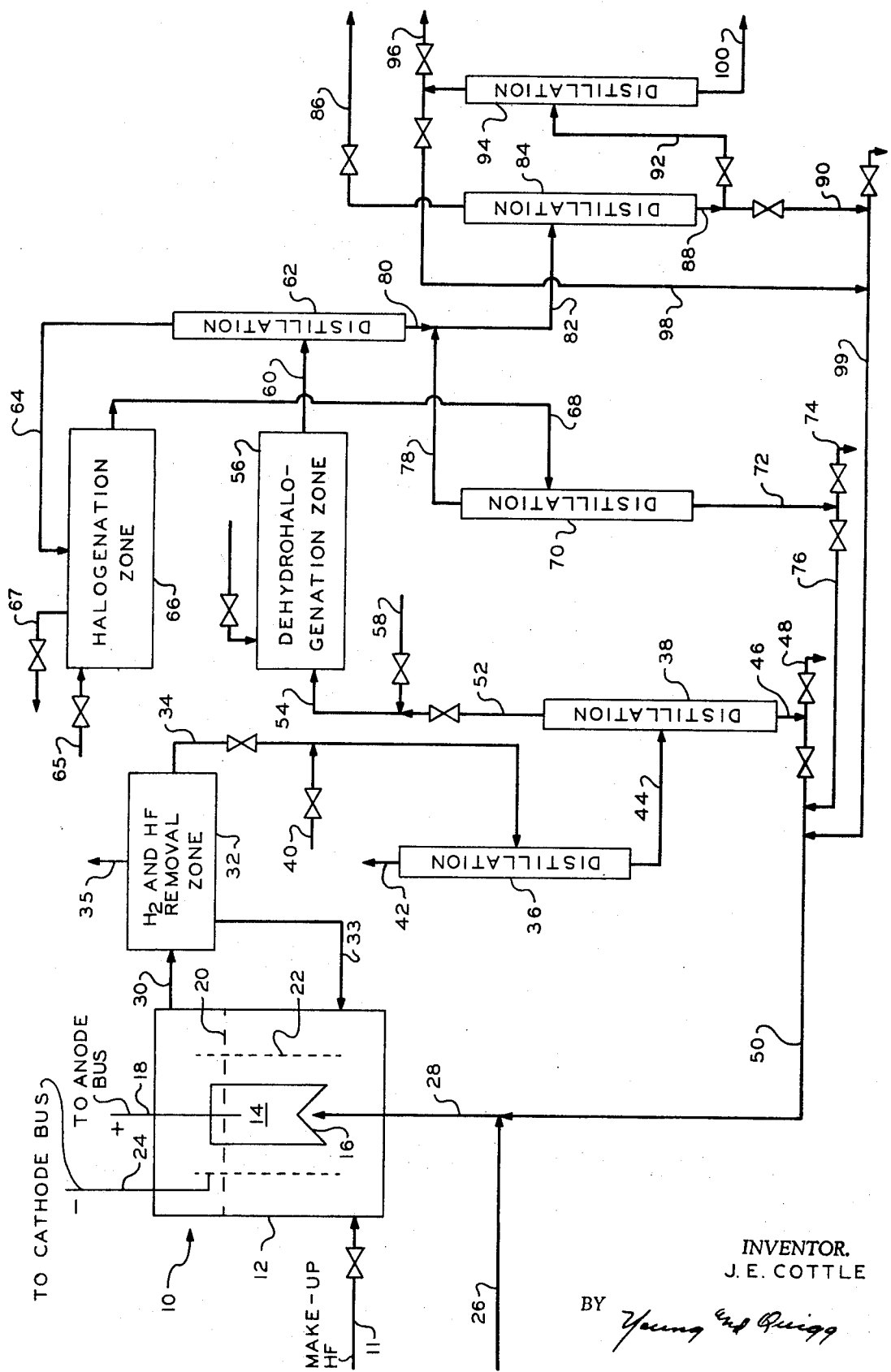

3,737,470
**SEPARATION AND RECOVERY OF PERHALO-
GENATED FLUOROCARBONS**
John E. Cottle, Bartlesville, Okla., assignor to
Phillips Petroleum Company
Filed June 8, 1970, Ser. No. 44,513
Int. Cl. C07c 17/34, 19/08, 21/18
U.S. Cl. 260—653                                                7 Claims

ABSTRACT OF THE DISCLOSURE

Perhalogenated fluorocarbons, e.g., perfluorocarbons and/or chlorofluorocarbons, contained in a mixture together with partially halogenated fluorohydrocarbons, e.g., chlorofluorohydrocarbons, are separated and recovered by dehydrohalogenating said partially halogenated fluorohydrocarbons to the corresponding olefins which are then halogenated to perhalogenated fluorocarbons. The resultant mixture is then fractionated to separate and recover the perhalogenated fluorocarbons.

---

This invention relates to the separation and recovery of perhalogenated fluorocarbons.

Herein and in the claims, unless otherwise specified, the term "perhalogenated fluorocarbons" is employed generically to refer to compounds (a) which contain only fluorine and carbon, and (b) also to compounds which contain only fluorine, carbon, and another halogen other than fluorine, e.g., chlorine; and the term "partially halogenated fluorohydrocarbons" or the term "halogenated fluorohydrocarbons" refers to compounds which contain only fluorine, carbon, hydrogen, and another halogen other than fluorine, e.g., chlorine. For convenience, the invention will be described herein with particular reference to perhalogenated fluorocarbons and halogenated fluorohydrocarbons wherein chlorine is the halogen present other than fluorine, for example, chlorofluorocarbons and chlorofluorohydrocarbons, respectively. However, the invention is not so limited. Said other halogen can also be bromine or iodine.

The invention is applicable to mixtures of perhalogenated fluorocarbons and halogenated fluorohydrocarbons obtained from any source. Said mixtures are commonly obtained in processes for fluorinating halogenated hydrocarbons, e.g., chlorinated hydrocarbons. One such process comprises direct fluorination using elemental fluorine. Another fluorination process comprises using cobalt trifluoride. However, in recent years more practical electrochemical fluorination processes have been developed. The invention is particularly applicable to product mixtures obtained in electrochemical fluorination processes.

Due to the reactivity of the fluorine and the other halogen present, e.g., chlorine, a considerable variety of products is produced in said fluorination processes. Thus, a problem common to all of said fluorination processes is the separation and recovery of the products obtained therein. This problem is aggravated by the fact that in many instances the boiling points of some of said products are close, making separation by fractional distillation difficult.

The present invention provides a solution to the above-described problems. Broadly speaking, the present invention provides a combination of steps wherein in a mixture containing perhalogenated fluorocarbons, e.g., chlorofluorocarbons, together with partially halogenated fluorohydrocarbons, e.g., chlorofluorohydrocarbons, said partially halogenated fluorohydrocarbons are first dehydrohalogenated to the corresponding olefins. Said olefins are then halogenated to perhalogenated fluorocarbons, and the resultant mixture is then fractionated to separate and recover said perhalogenated fluorocarbons.

An object of this invention is to provide a method for the separation of, and the recovery of, perhalogenated fluorocarbon compounds present in mixtures containing the same together with halogenated fluorohydrocarbon compounds. Another object of this invention is to provide an improved electrochemical fluorination process. Still another object of this invention is to provide an improved process for the separation of, and the recovery of, valuable perhalogenated fluorocarbon compounds present in a cell effluent stream from an electrochemical fluorination process for the fluorination of 1,2-dichloroethane. Other aspects, objects, and advantages of the invention will be apparent to those skilled in the art in view of this disclosure.

Thus, according to the invention, there is provided a process for the separation of, and the recovery of, perhalogenated fluorocarbons contained in a mixture with halogenated fluorohydrocarbons which contain a halogen other than fluorine and at least some of which are capable of being dehydrohalogenated to the corresponding olefin, which process comprises, in combination, the steps of: (a) contacting said mixture in a dehydrohalogenation zone with a dehydrohalogenation agent and dehydrohalogenating said halogenated fluorohydrocarbons to remove therefrom at least one atom of hydrogen and one atom of said halogen other than fluorine and produce a second mixture containing said corresponding olefins; (b) fractionating an effluent stream from said dehydrohalogenation zone to recover an overhead stream comprising said olefins, and a bottoms stream comprising perhalogenated fluorocarbons; (c) passing said overhead stream from step (b) to a halogenation zone and therein halogenating said olefins to perhalogenated fluorocarbons; (d) fractionating an effluent stream from said halogenation zone to recover an overhead stream comprising said perhalogenated fluorocarbons produced in said step (c); (e) combining said bottoms stream from step (b) and said overhead stream from step (d) to obtain a second mixture comprising said perhalogenated fluorocarbons present in said first mixture and said perhalogenated fluorocarbons produced in said step (c); and (f) fractionating said second mixture to separate and recover said perhalogenated fluorocarbons.

Further, according to the invention, there is provided in a process for the fluorination of a halogenated hydrocarbon feedstock wherein there is produced a mixture of perhalogenated fluorocarbons containing a halogen other than fluorine and partially halogenated fluorohydrocarbons also containing said halogen other than fluorine, and wherein said perhalogenated fluorocarbons are recovered from said mixture, the improvement comprising: (a) passing at least a portion of said mixture to a dehydrohalogenation zone and therein dehydrohalogenating said partially halogenated fluorohydrocarbons to remove therefrom at least one atom of hydrogen and one atom of said halogen other than fluorine and produce a second mixture containing said corresponding olefins; (b) fractionating an effluent stream from said dehydrohalogenation zone to recover an overhead stream comprising said olefins, and a bottoms stream comprising perhalogenated fluorocarbons; (c) passing said overhead stream from step (b) to a halogenation zone and therein halogenating said olefins to perhalogenated fluorocarbons; (d) fractionating an effluent stream from said halogenation zone to recover an overhead stream comprising said perhalogenated fluorocarbons produced in said step (c); (e) combining said bottoms stream from step (b) and said overhead stream from step (d) to obtain a second mixture comprising said perhalogenated fluorocarbons present in said first mixture and said perhalogenated fluorocarbons produced in step (c); and (f) fractionating said second mixture to separate and recover said perhalogenated fluorocarbons.

A number of advantages are obtained or realized in the practice of the invention. One important advantage is that the separation and recovery of perhalogenated fluorocarbons is facilitated. Another important advantage is that the production of desired products can be increased and the production of undesired products decreased. For example, the invention is particularly advantageous when it is desired to increase the production of the desirable product 1,1,2-trichloro-1,2,2-trifluoroethane. Mixtures of perhalogenated fluorocarbons and partially halogenated fluorohydrocarbons containing said 1,1,2-trichloro-1,2,2-trifluoroethane usually also contain appreciable amounts of 1,2-dichloro-1,2,2-trifluoroethane. In the practice of this invention said 1,2-dichloro-1,2,2-trifluoroethane is ultimately converted to said desirable product 1,1,2-trichloro-1,2,2-trifluoroethane, thus increasing the production of said desirable product. Another important advantage is that the perhalogenated fluorocarbon products can be recovered in increased purity. For example, said desired product, 1,1,2-trichloro-1,2,2,-trifluoroethane boils at 47.6° C. In mixtures of the type to which this invention relates there is usually also present a significant amount of 1,2-dichloro-1,1-difluoroethane which boils at 46.8° C. From a practical fractionation standpoint it is very difficult to separate these two compounds. In the practice of this invention said 1,2-dichloro-1,1-difluoroethane is ultimately converted to 1,2,2,-trichloro-1,1-difluoroethane, having a boiling point of 71.9° C., which presents no particular problem in separation. Another important advantage is that more efficient electrochemical fluorination is obtained by eliminating undesirable components from the stream or streams recycled through the electrochemical fluorination cell when the mixture being separated in accordance with the invention is obtained as a product of electrochemical fluorination. This provides the additional advantage of increased flexibility in the electrochemical fluorination process in that operating parameters can be more readily adjusted to vary the ratio of desired products. Said advantages are illustrated further hereinafter in connection with the example.

The invention is applicable to mixtures of perhalofluorocarbons and halogenated fluorohydrocarbons obtained from any source. The invention is particularly applicable to such mixtures which are obtained as a cell effluent stream from an electrochemical fluorination process. Thus, the invention is applicable to electrochemical fluorination processes wherein the feedstock is dissolved in the electrolyte. The invention is also applicable to electrochemical fluorination process wherein the feedstock is bubbled into the electrolyte through a porous anode. In a presently preferred electrochemical fluorination process, to which the invention is particularly applicable, a current-conducting, essentially anhydrous, liquid hydrogen fluoride electrolyte is electrolyzed in an electrolysis cell provided with a cathode and a nonwetting porous anode (preferably porous carbon), and the feedstock is introduced into the pores of said anode and fluorinated within said pores.

Briefly, said preferred electrochemical fluorination process comprises passing the feedstock to be fluorinated into the pores of a nonwetting porous anode, e.g., porous carbon, disposed in a current-conducting, essentially anhydrous, hydrogen fluoride electrolyte such as KF·2HF. Said feedstock contacts the fluorinating species within the pores of the anode and is therein at least partially fluorinated. Generally speaking, said fluorination can be carried out at temperatures within the range of from —80 to 500° C. at which the vapor pressure of the electrolyte is not excessive. A preferred temperature range is from about 60 to 120° C. Pressures substantially above or below atmospheric can be employed if desired. Generally speaking, the process is conveniently carried out at substantially atmospheric pressures. The feedstock to be fluorinated is preferably introduced into the pores of the anode at a rate such that there is established a pressure balance within the pores of the anode between the feedstock entering the pores and electrolyte attempting to enter said pores from another and opposing direction. Said feedstock flow rate can be within the range of from 3 to 600 milliliters per minute per square centimeter of anode cross-sectional area, taken perpendicular to the direction of flow and expressed in terms of gaseous volume calculated at standard conditions. Current densities, employed can be within the range of 30 to 1000, preferably 50 to 500, milliamps per square centimeter of anode geometric surface area. Typical cell voltages employed can range from 4 to 12 volts. Converted and unconverted products are withdrawn from the pores of the anode and the products recovered from a cell effluent stream.

Further details of said preferred electrochemical fluorination process can be found in U.S. Pat. 3,511,760, issued May 12, 1970, to H. M. Fox and F. N. Ruehlen.

As illustrated herein, the invention is particularly applicable to mixtures of aliphatic perhalofluorocarbons and halogenated fluorohydrocarbons containing 2 carbon atoms per molecule. However, the invention is not limited to such mixtures. The invention is applicable to mixtures and the separation and recovery or perhalofluorocarbons and halogenated fluorohydrocarbons containing more than 2 carbon atoms per molecule, e.g., up to 4 carbon atoms per molecule, and higher.

The drawing is a diagrammatic flow sheet illustrating one presently preferred embodiment of the invention wherein a feedstock, e.g., 1,2-dichloroethane, is fluorinated and the products obtained are separated in accordance with the invention.

Referring now to the drawing, the invention will be more fully explained. By way of example, and not by way of limitation, the invention will de described with particular reference to using 1,2-dichloroethane as the fresh feedstock to an electrolytic cell. Thus, the typical operating conditions given herein in connection with using said feedstock and separating the products obtained therefrom are not to be construed as limiting on the invention. It will also be understood that many valves, pumps, control instruments, etc., not necessary for explaining the invention have been omitted for the sake of brevity. In said drawing there is illustrated an electrolytic cell, denoted generally by the reference numeral 10, comprising a cell body 12 having an anode 14 disposed therein. As here illustrated diagrammatically, said anode in its simplest form comprises a cylinder of porous carbon having a cavity 16 formed in the bottom thereof. Any suitable anode can be employed in said cell. Examples of other suitable anodes can be found in U.S. Pat. 3,511,762, issued May 12, 1970, to W. V. Childs. A current collector 18 usually comprising a rod or hollow conduit of a metal such as copper, is provided in intimate contact with the upper portion of said anode 14 and is connected to the anode bus of the current supply. Preferably, the upper end of anode 14 extends above the electrolyte level 20. However, it is within the scope of the invention for the top of said anode to be below said electrolyte level. A circular cathode 22, which can be a screen formed of a suitable metal, such as carbon steel or stainless steel, surrounds said anode 14 and is connected to the cathode bus of the current supply by a suitable lead wire 24. Any suitable source of current and connections thereto can be employed.

In the operation of the system illustrated, a feedstock such as 1,2-dichloroethane is introduced into the cavity portion 16 of said anode via conduits 26 and 28, travels upward through the pores of said anode, and exits from the upper end of the anode above electrolyte level 20. During passage through said anode at least a portion of the feedstock is electrochemically fluorinated. Fluorinated products together with remaining unconverted feedstock, hydrogen, and possibly some electrolyte vapors, are withdrawn from the space above the electrolyte within cell 12 via conduit 30. During the introduction of said feedstock an electric current in an amount sufficient to supply the desired operating current density at the anode is passed between the anode and the cathode.

The cell effluent stream in conduit 30 is passed into hydrogen and HF removal zone 32. Said zone 32 can comprise any suitable means for removing hydrogen and HF from the cell effluent stream. For example, said cell effluent stream can first be cooled, by either direct heat exchange or indirect heat exchange, to a temperature which is near its dew point but which is insufficient to cause any significant condensation of the components thereof. As will be understood by those skilled in the art, said dew point will vary with the composition of said effluent stream and the pressure thereon. Thus, the temperature to which said effluent stream is cooled can vary widely. When 1,2-dichloroethane is the charge stock to the electrochemical fluorination cell, said dew point will usually be in the order of about 115 to about 125° F. (46–52° C.). Generally speaking, it is desirable to cool said effluent stream as nearly as practical to its dew point without causing said condensation of the components thereof. In most instances said effluent stream will be cooled to a temperature which is within about 3 to 10° F. (1 to 5° C.) above said dew point. The cooled effluent stream can then be compressed to a pressure of about 30 p.s.i.a. and then chilled by refrigeration to a temperature of about −20° F. (−29° C.) at a pressure of about 27 p.s.i.a. The chilled effluent stream can then be passed to a phase separation zone from which hydrogen can be removed, compressed, and said compressed hydrogen chilled by means of refrigeration to a temperature of about −100° F. (−73° C.) at a pressure of about 80 p.s.i.a. Said chilled hydrogen-containing stream can then be passed to a second phase separation zone from which hydrogen is vented. Liquid hydrogen fluoride can be returned from second phase separation zone to said first-mentioned phase separation zone. A stream of liquid hydrogen fluoride can be recycled from said first phase separation zone to the electrolytic cell, if desired. A second liquid stream comprising the fluorinated products contained in the cell effluent stream can be withdrawn from the first phase separation zone and passed to a stripping zone for the removal of trace amounts of hydrogen fluoride which may remain therein. The above-described method for the removal of hydrogen and HF from the cell effluent stream is disclosed and claimed in copending application Ser. No. 44,041, filed June 8, 1970, by R. O. Dunn, now U.S. Pat. 3,660,254 issued May 2, 1972.

The now essentially hydrogen-free and essentially HF-free effluent stream is removed from zone 32 via conduit 34 and passed into a first distillation zone comprising a first fractionation column 36 and a second fractionation column 38. As indicated above, the invention is applicable to mixtures of perhalogenated fluorocarbons and halogenated fluorohydrocarbons from any source. Thus, it is within the scope of the invention to introduce such a mixture into the system from an outside source via conduit 40. Said first fractionation column 36 can conveniently be operated at a pressure of about 130 p.s.i.a., a top tower temperature of about 145° F. (63° C.), and a bottom tower temperature of about 256 F (124° C.). An overhead stream comprising chloropentafluoroethane and 1-chloro-1,1,2,2-tetrafluoroethane, and possibly a small amount of 1,2-dichlorotetrafluoroethane, is withdrawn from said fractionation column 36 via conduit 42. If desired, said overhead stream in conduit 42 can be further fractionated for the recovery of said chloropentafluoroethane as a product of the process. If the mixture introduced into distillation column 36 was obtained from an electrochemical fluorination cell, the 1-chloro-1,1,2,2-tetrafluoroethane recovered from said further fractionation of the stream in conduit 42 can be recycled to the electrochemical fluorination cell. A bottom stream comprising the major portion of the cell effluent stream is withdrawn from fractionation column 36 via conduit 44 and introduced into second fractionation column 38. Said second fractionation column 38 can conveniently be operated at a pressure of about 170 p.s.i.a., a top tower temperature of about 120° F. (49° C.), and a bottom tower temperature of about 340° F. (171° C.). A bottom stream comprising unreacted 1,2-dichloroethane feedstock and the higher boiling fluorinated products is withdrawn from said fractionation column 38 via conduit 46. Such stream in conduit 46 can be removed from the system via conduit 48 if desired. However, in those instances where the invention is being practiced in connection with an electrochemical fluorination process, said stream in conduit 46 will preferably be passed to conduit 50 for recycle to the electrochemical fluorination cell 12 as a portion of the feedstock thereto.

An overhead stream comprising perhalogenated fluorocarbons and partially halogenated fluorohydrocarbons having boiling points below approximately 50° C. is withdrawn from said second fractionation column 38 via conduit 52 and passed via conduit 54 into dehydrohalogenation zone 56. If desired, depending upon the composition thereof, a mixture of perhalogenated fluorocarbons and partially halogenated fluorohydrocarbons can be introduced into the system via conduit 58, instead of, or in addition to, the stream from conduit 52, and then introduced via conduit 54 into said dehydrohalogenation zone 56.

Said dehydrohalogenation zone can comprise any suitable process and means known in the art for dehydrohalogenating materials capable of being dehydrohalogenated, i.e., materials having a halogen atom on one carbon atom and a hydrogen atom on an adjacent carbon atom. Any suitable dehydrohalogenation agent can be used in the practice of the invention. The alkaline dehydrohalogenating agents are preferred. However, it is within the scope of the invention to use the so-called acidic dehydrohalogenation agents. Examples of alkaline dehydrohalogenating agents include, among others, the alkali metal hydroxides such as sodium hydroxide, potassium hydroxide, etc., the alkaline earth metal oxides and hydroxides such as calcium oxide, calcium hydroxide, etc., and various organic bases. Lime (calcium oxide) is a presently most preferred dehydrohalogenating agent.

Said dehydrohalogenation zone can comprise a stirred batch reactor provided with a heating or cooling jacket through which a heat exchange medium can be passed. Said stirred batch reactor represents one preferred type of apparatus. It is within the scope of the invention to use two or more such reactors manifolded together for "on-off" operation, e.g., one or more vessels on stream while one or more other vessels are being recharged with dehydrohalogenating agent. It is within the scope of the invention to employ other dehydrohalogenating means such as packed columns wherein a liquid dehydrohalogenating agent such as a solution of sodium hydroxide is passed countercurrently to a stream being treated, or continuous or semicontinuous means wherein a solution or other dispersion of the dehydrohalogenating agent is passed countercurrent to the stream being treated.

The dehydrohalogenation reaction can be carried out under any reaction conditions of temperature, pressure, time, and using any amount of dehydrohalogenating agent suitable for effecting the desired dehydrohalogenation. The actual choice of said reaction conditions will depend upon, to a large extent, the dehydrohalogenating agent being used and the materials being treated. The temperature should not be great enough to cause dehydrofluorination. Generally speaking, the temperature can be within the range of about 110 to 500° F. (43 to 260° C.). The pressure will be sufficient to maintain the dehydrohalogenating agent in liquid or solid phase, and will usually be within the range of from about 15 to about 680 p.s.i.a. It is preferred that the stream or material being treated be in the vapor phase. However, it is within the scope of the invention for said material being treated to be in the liquid phase. When lime (calcium oxide) is being used as the dehydrohalogenating agent, the preferred temperature will usually be in the range of about 150 to 200° F. (66 to 93° C.), and the pressure will be within the range of about 50 to 150 p.s.i.a.

The amount of dehydrohalogenating agent present in the dehydrohalogenation zone will be an amount which is at least sufficient to react with the halogen acid being removed from the partially halogenated fluorohydrocarbon impurity. For example, when said dehydrohalogenating agent is lime, the stoichiometric amount is 0.5 mol of lime per mol of halogen acid being removed. Stated another way, when chlorine is halogen to be removed, the amount of lime required will be in the order of 0.8 pound of lime per pound of chlorine to be removed. It is preferred to use an excess of lime in the dehydrohalogenation zone, e.g., up to about 200, preferably 25 to 50, weight percent excess over the stoichiometric amount. Said lime can conveniently be charged to the reactor as an aqueous slurry containing from about 10 to about 40, preferably from about 15 to about 30, weight percent of lime. The contact time is not critical because the reaction proceeds smoothly and rapidly to essential completion with the formation of the corresponding olefins. Depending upon the efficiency of the contacting between the material being treated and the dehydrohalogenating agent, the contact time will usually be in the range of from about 10 seconds to about 30 minutes.

An effluent stream comprising said corresponding olefins and perhalogenated fluorocarbons is withdrawn from dehydrohalogenation zone 56 via conduit 60 and introduced into a third fractionation zone comprising fractionation column 62. Said column 62 can conveniently be operated at a pressure of about 200 p.s.i.a., a top tower temperature of about 120° F. (49° C.), and a bottom tower temperature of about 220° F. (104° C.). An overhead stream comprising said corresponding olefins is withdrawn from said fractionation column 62 via conduit 64 and introduced into halogenation zone 66. Said halogenation zone 66 can comprise any suitable process and apparatus known to the art for halogenating fluorinated hydrocarbons. For example, said halogenation zone can comprise means for halogenating the fluorohydrocarbons thermally by the methods disclosed in U.S. Pat. 2,644,845. Preferably, said halogenation zone will comprise means for photochemically halogenating said fluorohydrocarbons using ultraviolet light by methods well known in the art. Said photochemical processes are usually caried out by contacting the material to be halogenated with a halogen, e.g., chlorine, at a temperature within the range of from about −30 to 100° C., preferably about 10 to about 30° C., and a pressure sufficient to maintain the material being halogenated in liquid phase. However, any suitable reaction conditions, including vapor phase conditions, can be used in the practice of the invention. Said halogenation reaction is preferably carried to completion. Further details of photochemical halogenation processes can be found in U.S. Pats. 3,494,844; 3,402,114; 3,296,108; 3,019,175, and others. In some instances, it will be preferred to carry out the halogenation batchwise, or semibatchwise, so as to more conveniently effect complete halogenation. However, it is within the scope of the invention to carry out said halogenation in a continuous manner, employing a plurality of stages and/or recycle within the halogenation zone so as to insure complete halogenation of the fluorohydrocarbons to chlorofluorocarbons. Halogen can be introduced into said halogenation zone via conduit 65. By-product halogen acid is withdrawn from the halogenation zone via conduit 67.

The stream comprising perhalogenated fluorocarbons is withdrawn from halogenation zone 66 via conduit 68 and introduced into a fourth fractionation zone comprising column 70. A stream comprising partially halogenated fluorohydrocarbons is withdrawn as a bottom stream from fractionation column 70 via conduit 72. If desired, said stream in conduit 72 can be removed from the system via conduit 74. However, when the mixture of perhalogenated fluorocarbons and partially halogenated fluorohydrocarbons being processed in accordance with the invention is obtained as an effluent stream from an electrochemical fluorination process, it is preferred that the stream in conduit 72 be passed into conduit 76 for recycle via conduit 50 to said electrochemical fluorination cell as a portion of the feedstock thereto.

An overhead stream comprising 1,1,2-trichloro-1,2,2-trifluoroethane is withdrawn from fractionation column 70 via conduit 78, and is combined with a bottom stream comprising said trichlorotrifluoroethane and 1,2-dichlorotetrafluoroethane withdrawn from fractionation column 62 via conduit 80. The combined stream is then passed via conduit 82 into a fiifth fractionation zone comprising fractionation column 84 and fractionation column 94. Said fractionation column 84 can conveniently be operated at a pressure of about 65 p.s.i.a., a top tower temperature of about 120° F. (49° C.), and a bottom tower temperature of about 215° F. (102° C.). An overhead stream comprising said 1,2-dichlorotetrafluoroethane is withdrawn from fractionation column 84 via conduit 86 as a product of the process. A bottom stream comprising said 1,1,2-trichloro-1,2,2-trifluoroethane is withdrawn from fractionation column 84 via conduit 88. Said stream in conduit 88 will frequently contain some 1,2-dichloro-1,2,2-trifluoroethane. In such instances, if desired, at least a portion thereof can be passed via conduit 90 into conduit 50 for recycle to the electrochemical fluorination cell for the further production of said 1,2-dichlorotetrafluoroethane. In most instances, and particularly when it is desired to produce the maximum amount of said 1,1,2-trichloro-1,2,2-trifluoroethane said stream in conduit 88 will preferably be passed via conduit 92 into fractionation column 94. Said fractionation column 94 can conveniently be operated at a pressure of about 30 p.s.i.a., a top tower temperature of about 123° F. (51° C.), and a bottom tower temperature of about 160° F. (71° C.). An overhead stream comprising said 1,2-dichloro-1,2,2-trifluoroethane is withdrawn from fractionation column 94 via conduit 96 and removed from the system. If desired, said stream in conduit 96 can be passed via conduit 98 into conduit 99 for introduction into conduit 50 for recycle to the electrochemical fluorination cell. A bottom stream comprising said 1,1,2 - trichloro - 1,2,2 - trifluoroethane is withdrawn from fractionation column 94 via conduit 100 as a major product of the process.

The following calculated example will serve to further illustrate the invention. The conditions set forth for the operation of the electrochemical fluorination cell are based upon numerous laboratory and pilot plant runs carried out for the electrochemical fluorination of 1,2-dichloroethane.

EXAMPLE

In this illustrative embodiment a run is carried out for the electrochemical fluorination of 1,2-dichloroethane in a system embodying the essential features of the system illustrated in the drawing and using an electrolyte in cell 10 which has an approximate composition of KF·2HF. Porous carbon cylinders embodying the essential features of anode 14 illustrated diagrammatically in the drawing are employed as anodes. Fresh 1,2-dichloroethane feedstock is introduced via conduits 26 and 28 into the pores of anode 14. Recycle feedstock is supplied by conduit 50. The conversion in electrolytic cell 10 is carried out at an electrolyte temperature of about 210° F. (99° C.), employing a current density of about 250 amperes per square foot of anode geometric surface area, and a voltage of about 9.5 volts, D.C. The pressure in cell 10, and conduit 30, is substantially atmospheric. A cell effluent stream is withdrawn via conduit 30 and processed in zone 32 for the removal of hydrogen and HF, and the return of a recycle stream of HF via conduit 33. Hydrogen is removed from the system via conduit 35. Table I below sets forth the principal components in said cell effluent stream and the principal components in the other major streams of the system, and a calculated material balance for the system.

dustry. In the separation of mixture such as that set forth in feed stream 34 by fractional distillation, the recovery of the product 1,2-dichlorotetrafluoroethane is favored with the ratio of recovered said trichlorotrifluoroethane product to recovered said dichlorotetrafluoroethane product being approximately 0.6. In the practice of this invention the ratio of recovered said trichlorotrifluoroethane product to recovered said dichlorotetrafluoroethane product from said stream 34 is approximately 1.6. Both of said

TABLE I

| Components | Stream number, mols per hour | | | | | | | | | | | | | |
|---|---|---|---|---|---|---|---|---|---|---|---|---|---|---|
|  | 34 | 42 | 44 | 52 | 46 | 60 | 64 | 80 | 68 | 78 | 72 | 86 | 92 | 96 | 100 |
| $CClF_2$—$CClF_2$ | 16.3 | 0.8 | 15.5 | 15.5 |  | 55.5 |  | 15.5 |  |  |  | 15.5 |  |  |  |
| $CHClF$—$CClF_2$ | 14.7 |  | 14.7 | 14.7 |  |  |  |  | 0.66 | 0.66 |  |  | 0.66 | 0.66 |  |
| $CClF_2$—$CH_2Cl$ | 5.4 |  | 5.4 | 5.4 |  |  |  |  | 0.66 | 0.06 | 0.60 |  | 0.06 |  | 0.06 |
| $CHClF$—$CHClF$ | 9.8 |  | 9.8 | 2.0 | 7.8 |  |  |  |  |  |  |  |  |  |  |
| $CHClF$—$CH_2Cl$ | 14.7 |  | 14.7 | 0.2 | 14.5 |  |  |  |  |  |  |  |  |  |  |
| $CH_2Cl$—$CH_2Cl$ a | 24.3 |  | 24.3 |  | 24.3 |  |  |  |  |  |  |  |  |  |  |
| $CClF_2$—$CF_3$ | 0.57 | 0.57 |  |  |  |  |  |  |  |  |  |  |  |  |  |
| $CHF_2$—$CClF_2$ | 0.66 | 0.66 |  |  |  |  |  |  |  |  |  |  |  |  |  |
| $CHClF$—$CHF_2$ | 0.66 |  | 0.66 | 0.66 |  |  |  |  |  |  |  |  |  |  |  |
| $CHF_2$—$CH_2Cl$ | 0.66 |  | 0.66 | 0.66 |  |  |  |  |  |  |  |  |  |  |  |
| $CCl_2F$—$CClF_2$ | 10.0 |  | 10.0 | 9.8 | 0.2 | 9.8 |  | 9.8 | 14.7 | 14.7 |  |  | 24.5 | 0.05 | 24.45 |
| $CHCl_2$—$CHClF$ | 19.6 |  | 1.96 |  | 1.96 |  |  |  | 0.2 |  | 0.2 |  |  |  |  |
| $CHCl_2$—$CH_2Cl$ | 0.98 |  | 0.98 |  | 0.98 |  |  |  |  |  |  |  |  |  |  |
| $CClF$=$CF_2$ |  |  |  |  |  | 14.7 | 14.7 |  |  |  |  |  |  |  |  |
| $CHCl$=$CF_2$ |  |  |  |  |  | 5.4 | 5.4 |  |  |  |  |  |  |  |  |
| $CHF$=$CClF$ |  |  |  |  |  | 2.0 | 2.0 |  |  |  |  |  |  |  |  |
| $CHF$=$CHCl$ |  |  |  |  |  | 0.2 | 0.2 |  |  |  |  |  |  |  |  |
| $CHCl_2$—$CClF_2$ |  |  |  |  |  |  |  |  | 5.4 |  | 5.4 |  |  |  |  |
| $CHClF$—$CCl_2F$ |  |  |  |  |  |  |  |  | 2.0 |  | 2.0 |  |  |  |  |
| $CHF$=$CF_2$ |  |  |  |  |  | 0.66 | 0.66 |  |  |  |  |  |  |  |  |
| $CH_2$=$CF_2$ |  |  |  |  |  | 0.66 | 0.66 |  |  |  |  |  |  |  |  | a Fresh feedstock to cell.

From the data set forth in Table I above, it can be readily seen that the production of 1,1,2-trichloro-1,2,2-trifluoroethane is markedly increased in the practice of the invention, even on a once-through basis. For example, referring to feed stream 34 in Table I, it will be noted that said stream 34 contains 10 moles per hour of 1,1,2-tricholo-1,2,2-trifluoroethane. Product stream 100 contains 24.45 mols per hour of said trichlorotrifluoroethane product. This increase in the production of said trichlorotrifluoroethane product is due largely to the conversion of 1,2-dichloro-1,2,2-trifluoroethane which, in the practice of this invention, is converted to said 1,1,2-trichloro-1,2,2-trifluoroethane product. Said 1,2-dichloro-1,2,2-trifluoroethane is converted in dehydrohalogenation zone 56 to 1-chloro-1,2,2-trifluoroethylene, which in turn is converted to said trichlorotrifluoroethane product in chlorination zone 66, which product is ultimately recovered via conduit 100. It will also be noted that said trichlorotrifluoroethane product recovered in conduit 100 is a high purity product. Said trichlorotrifluoro product has a boiling point of 47.6° C. Another fluorinated material which is usually present in mixtures treated in accordance with this invention, 1,2-dichloro-1,1-difluoroethane, has a boiling point of 46.8° C. This makes the recovery of said trichlorotrifluoroethane product by fractional distillation very difficult and very expensive from a practical operating standpoint. This difficult separation is avoided in the practice of the present invention because said 1,2-dichloro-1,1-difluoroethane is converted in dehydrohalogenation zone 56 to 1-chloro-2,2-difluoroethylene, which in turn is then converted to 1,2,2-trichloro-1,1-difluoroethane in halogenation zone 66. This last-mentioned material has a boiling point of 71.9° C., thus eliminating the above-referred-to difficult fractionation problem.

Said 1,1,2-trichloro-1,2,2-trifluoroethane is a valuable product having utility as a refrigerant, and particularly valuable utility as a cleaning solvent in the aerospace industry. products can be employed as refrigerants. However, due to its lower volatility, said trichlorotrifluoroethane product, having a boiling point of 47.6° C. compared to a boiling point of only 3.6° C. for said dichlorotetrafluoro product, is preferred for a cleaning solvent. The increased amount of said trichlorotrifluoro product is an important consideration when one is interested in producing said product for the cleaning solvent market.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. In a process for the separation of, and the recovery of, saturated perhalogenated acyclic fluorocarbons contained in a mixture with saturated halogenated acyclic fluorohydrocarbons which contain a halogen other than fluorine and at least some of which are capable of being dehydrohalogenated to the corresponding olefin, which process comprises, in combination, the steps of:
    (a) contacting said mixture in a dehydrohalogenation zone with a dehydrohalogenation agent and dehydrohalogenating said halogenated fluorohydrocarbon compounds to remove therefrom at least one atom of hydrogen and one atom of said halogen other than fluorine and produce a second mixture containing said corresponding olefins; and
    (b) fractionating an effluent stream from said dehydrohalogenation zone to recover an overhead stream comprising said olefins, and a bottoms stream comprising said perhalogenated fluorocarbons; the improvement comprising
    (c) passing said overhead stream from step (b) to a halogenation zone and therein halogenating said olefins to perhalogenated fluorocarbons;

(d) fractionating an effluent stream from said halogenation zone to recover an overhead stream comprising said perhalogenated fluorocarbon produced in said step (c);

(e) combining said bottoms stream from step (b) and said overhead stream from step (d) to obtain a second mixture comprising said perhalogenated fluorocarbons present in said first mixture and said perhalogenated fluorocarbon produced in said step (c); and (f) fractionating said second mixture to separate and recover said perhalogenated fluorocarbons.

2. A process according to claim 1 wherein said halogen other than fluorine is chlorine.

3. A process according to claim 1 wherein:
said first-mentioned mixture comprises perhalogenated fluorocarbons including
1,2-dichlorotetrafluoroethane and
1,1,2-trichloro-1,2,2-trifluoroethane; and
partially halogenated fluorohydrocarbons including
1,2-dichloro-1,2,2-trifluoroethane,
1,2-dichloro-1,1-difluoroethane, and
1,2-dichloro-1,2-difluoroethane;
said overhead stream recovered in step (b) comprises
1-chloro-1,2,2-difluoroethylene,
1-chloro-2,2-difluoroethylene, and
1-chloro-1,2-difluoroethylene;
said bottoms stream recovered in step (b) comprises
1,2-dichlorotetrafluoroethane and
1,1,2-trichloro-1,2,2-trifluoroethane;
said overhead stream recovered in step (d) comprises
1,1,2-trichloro-1,2,2-trifluoroethane; and
said second mixture of step (e) is fractionated in step (f) to recover 1,2-dichlorotetrafluoroethane as one perhalogenated fluorocarbon product of the process, and 1,1,2 - trifluoro-1,2,2-trifluoroethane as another perhalogenated fluorocarbon product of the process.

4. A process according to claim 3 wherein said first-mentioned mixture also contains chloropentafluoroethane and, prior to step (a), said mixture is fractionated to recover a stream comprising said chloropentafluoroethane as another product of the process.

5. A process according to claim 1 wherein said perhalogenated fluorocarbons and said partially halogenated fluorohydrocarbons each contain from 2 to 4 carbon atoms per molecule.

6. A process according to claim 5 wherein said perhalogenated fluorocarbons and said partially halogenated fluorohydrocarbons each contain 2 carbon atoms per molecule.

7. In a process for the fluorination of a halogenated hydrocarbon feedstock wherein there is produced a mixture of saturated perhalogenated acyclic fluorocarbons containing a halogen other than fluorine and partially halogenated saturated acyclic fluorohydrocarbons also containing said halogen other than fluorine, and wherein said perhalogenated fluorocarbons are recovered from said mixture, by (a) passing at least a portion of said mixture to a dehydrohalogenation zone and therein dehydrohalogenating said partially halogenated fluorohydrocarbons to remove therefrom at least one atom of hydrogen and one atom of said halogen other than fluorine and produce a second mixture containing corresponding olefins; and (b) fractionating an effluent stream from said dehydrohalogenation zone to recover an overhead stream comprising said olefins, and a bottoms stream comprising perhalogenated fluorocarbons; the improvement comprising (c) passing said overhead stream from step (b) to a halogenation zone and therein halogenating said olefins to perhalogenated fluorocarbons;

(d) fractionating an effluent stream from said halogenation zone to recover an overhead stream comprising said perhalogenated fluorocarbons produced in said step (c);

(e) combining said bottoms stream from step (b) and said overhead stream from step (d) to obtain a second mixture comprising said perhalogenated fluorocarbons present in said first-mentioned mixture and said perhalogenated fluorocarbons produced in step (c); and (f) fractionating said second mixture to separate and recover said perhalogenated fluorocarbons.

References Cited
UNITED STATES PATENTS

| | | | |
|---|---|---|---|
| 2,628,989 | 2/1953 | Miller | 260—653.5 |
| 2,894,043 | 7/1959 | Prill | 260—653.5 |
| 3,200,160 | 8/1965 | Sianesi et al. | 260—653.5 |
| 3,442,961 | 5/1969 | Hutton | 260—653.5 |
| 2,673,173 | 3/1954 | Ruh | 260—653.5 |
| 2,674,632 | 4/1954 | Skiles | 260—653.5 |

OTHER REFERENCES

Lovelace: Aliphatic Fluorine Compounds, p. 59 (1958).
Hudlicky: Chemistry of Organic Fluorine Cpds., pp. 263–269 (1962).

DANIEL D. HORWITZ, Primary Examiner

U.S. Cl. X.R.

260—653.5; 204—59